US009768818B2

(12) United States Patent
Wong Chee

(10) Patent No.: US 9,768,818 B2
(45) Date of Patent: Sep. 19, 2017

(54) FUNCTIONAL FLIP COVER PROTECTIVE CASE WITH PHYSICAL KEYPAD FOR SMART PHONE DEVICES

(71) Applicant: Tieng Wong Chee, Penang (MY)

(72) Inventor: Tieng Wong Chee, Penang (MY)

(*) Notice: Subject to any disclaimer, the term of this patent is extended or adjusted under 35 U.S.C. 154(b) by 0 days.

(21) Appl. No.: 15/029,250

(22) PCT Filed: Oct. 10, 2014

(86) PCT No.: PCT/MY2014/000251
§ 371 (c)(1),
(2) Date: Apr. 13, 2016

(87) PCT Pub. No.: WO2015/057052
PCT Pub. Date: Apr. 23, 2015

(65) Prior Publication Data
US 2016/0277053 A1    Sep. 22, 2016

(30) Foreign Application Priority Data
Oct. 14, 2013  (MY) ............... PI 2013701945

(51) Int. Cl.
*H04M 1/02*    (2006.01)
*H04B 1/3888*    (2015.01)
(Continued)

(52) U.S. Cl.
CPC ........ *H04B 1/3888* (2013.01); *H04M 1/0202* (2013.01); *H04M 1/23* (2013.01);
(Continued)

(58) Field of Classification Search
CPC ................ H04M 1/0206; H04M 1/0241
(Continued)

(56) References Cited

U.S. PATENT DOCUMENTS 6,009,338 A    12/1999   Iwata et al.
6,208,879 B1    3/2001   Iwata et al.
(Continued)

FOREIGN PATENT DOCUMENTS

JP    2000-339079 A    12/2000
JP    3107960 U    4/2005
JP    2012-018478 A    1/2012

OTHER PUBLICATIONS

English language Abstract of JP 2012-018478 A.
(Continued)

*Primary Examiner* — John J Lee
(74) *Attorney, Agent, or Firm* — Hershkovitz & Associates, PLLC; Abe Hershkovitz

(57) ABSTRACT

A functional flip cover protective case having a physical keypad and a transparent viewing window for touch-based smart phone device is being disclosed. The functional flip cover protective case comprising an integral flip cover attached a protective case; the flip cover includes a built in physical keypad device and a transparent viewing window on the front side of the flip cover when the flip cover is in closed position; wherein the flip cover further comprising a sensor to detect opening and closing actions; wherein the protective case may comprising a data/power connector, and/or a Bluetooth device, and/or a NFC (Near Field Communication) device for corresponding between the physical keypad and the smart phone device; wherein upon closing the flip cover, the physical keypad will be activated to take over the input controls of the smart phone device. In addition, the display output on touch screen of the smart phone device will be limited within the boundary of the transparent viewing window; wherein upon the opening the flip cover, the physical keypad will be deactivated and return the input controls to the smart phone device; wherein further (Continued)

comprising a software module to be installed in the smart phone device to correspondence with the censor and physical keypad of the flip cover.

15 Claims, 11 Drawing Sheets

(51) Int. Cl.
  *H04M 1/23* (2006.01)
  *H04M 1/725* (2006.01)
(52) U.S. Cl.
  CPC ...... *H04M 1/72575* (2013.01); *H04M 1/0279* (2013.01); *H04M 1/0283* (2013.01)
(58) Field of Classification Search
  USPC .................................. 455/575.1, 575.8, 90.3
  See application file for complete search history.

(56) References Cited

U.S. PATENT DOCUMENTS

| | | |
|---|---|---|
| 6,535,749 B1 | 3/2003 | Iwata et al. |
| 2003/0008679 A1 | 1/2003 | Iwata et al. |
| 2006/0148531 A1 | 7/2006 | Iwata et al. |
| 2009/0065571 A1 | 3/2009 | Jain |
| 2009/0065572 A1 | 3/2009 | Jain |
| 2009/0069049 A1 | 3/2009 | Jain |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 | 3/2009 | Jain |
| 2009/0070691 A1 | 3/2009 | Jain |
| 2009/0070861 A1 | 3/2009 | Jain |
| 2009/0108063 A1 | 4/2009 | Jain et al. |
| 2009/0199283 A1 | 8/2009 | Jain |
| 2010/0012721 A1 | 1/2010 | Jain et al. |
| 2010/0044444 A1 | 2/2010 | Jain et al. |
| 2010/0264211 A1 | 10/2010 | Jain et al. |
| 2011/0053560 A1 | 3/2011 | Jain et al. |
| 2011/0136539 A1 | 6/2011 | Jain et al. |
| 2011/0177852 A1 | 7/2011 | Jain et al. |
| 2011/0215159 A1 | 9/2011 | Jain |
| 2012/0051272 A1 | 3/2012 | Jain et al. |
| 2012/0061466 A1 | 3/2012 | Jain et al. |
| 2012/0074231 A1 | 3/2012 | Jain et al. |
| 2012/0136734 A1 | 5/2012 | Jain |
| 2012/0231766 A1 | 9/2012 | Jain et al. |
| 2012/0267437 A1 | 10/2012 | Jain et al. |
| 2012/0268911 A1* | 10/2012 | Lin ....................... G06F 1/1628 361/807 |
| 2013/0292479 A1 | 11/2013 | Jain |
| 2014/0024342 A1 | 1/2014 | Jain et al. |
| 2014/0040117 A1 | 2/2014 | Jain |
| 2014/0129356 A1 | 5/2014 | Jain et al. |
| 2015/0335116 A1* | 11/2015 | Kim ....................... A45C 11/00 224/191 |

OTHER PUBLICATIONS

English language translation of the description and claims of JP 3107960 U.
English language Abstract of JP 2000-339079 A.
ISR of PCT/MY2014/000251 dated Feb. 10, 2015.
Written Opinion of PCT/MY2014/000251 dated Feb. 10, 2015.

\* cited by examiner

FUNCTIONAL FLIP COVER PROTECTIVE CASE WITH PHYSICAL KEYPAD FOR SMART PHONE DEVICES

FIELD OF THE INVENTION

The present invention relates to a protective flip cover device, and more particularly, to a protective flip cover device for a smart phone device. The protective flip cover device has a built-in physical keypad and a transparent viewing window for the smart phone device.

BACKGROUND OF THE INVENTION/RELATED ART

Smart phone devices may be portable electronic devices such as smart phones, cell phones, smart phone tablets, etc. Smart phone devices recently experienced rapid development and tend to employ various additional functions in addition to basic telephony functions. To cope with users' demands, smart phone devices having various functions have been launched.

Such a smart phone device includes a basic telephony function, and may have a digital camera module, and in addition thereto, is capable of performing communication through Wireless Fidelity (Wi-Fi) or 3.sup.rd Generation (3G), 4.sup.th Generation (4G) network, wireless communication with neighbouring devices through a Bluetooth module, and communication using Near Field Communication (NFC). In addition, a variety of location information services can be accessed using the smart phone by simultaneously employing a Global Positioning System (GPS) module, a terrestrial magnetism sensor, an ambient light sensor, etc. The usage environment of the smart phone and smart phone tablet can thus be automatically controlled using various communication and location functions.

Meanwhile, the smart phone and smart phone tablet allow a user to capture a video including High Definition (HD) video by using a built in digital camera, to listen to music in various file formats including MPEG Audio Layer-3 (MP3), and to enjoy a video file stored in the internal memory of or external memory card plug in to the smart phone devices.

A smart phone device may be also used to store, to view, to create and to manage electronic documents, personal data, etc.

The form of smart phone has evolved from the initial form like a bar-type form, a folder-type form, a slide-type form, etc., to a smart phone or smart phone tablet which has a typical bar-type form and has a touch input/output with a large screen placed to occupy a greater part of a front side of the smart phone device.

The recent trend of smart phone forms are mostly dominated by bar-type forms that have a large screen that occupies a majority of the surface area of the front side of the smart phone devices for better viewing and touch input/output experience. The size of the touch screen of a smart phone device also is getting bigger, from approximately 3.5" to 6.5" or more, and a smart phone tablet will have a touch screen size from approximately 7" to 10" or more.

The touch input of smart phone devices has virtually replaced all the functionalities of a traditional cell phone's physical keypad. However, there are some native characteristics of a physical keypad that cannot be replaced by touch input using touch screens. Such characteristics include the physical touch and press feel, a.k.a. tactile input of the physical keypad. The input accuracy of physical keypad also is much better compared with touch screen input, particularly when using a single hand and one thumb for inputting. In most of the cases, the input using a touch screen requires both hands to hold the smart phone device and use the thumbs to input, or one hand holding the smart phone device and the other hand doing the input using one or more fingers. Single hand input is the most difficult because of the sensitivity of a touch screen, and in particular when using a bigger size smart phone with a large touch screen.

The simplicity and fixed key layout region of a physical keypad also makes it possible for many users to make a call simply by using their thumbs without even looking at the phone screen, as they can feel the keys and their positioning. This advantage of physical keypads is hard to mimic by touch input using touch screens as touch screens are too sensitive, and users are prone to input wrongly. In addition, it is hard for smart phone users to make a call without looking at the phone's touch screen, as there is no physical touch feel like a physical keypad.

There are some smart phones that do provide both the touch screen and physical QWERTY keyboard as an input interface. However, the presence of a physical QWERTY keyboard will typically occupy approximately ¼ to ½ of the area of the front side of the smart phone devices. This will mean that the size of the touch screen will have to be made smaller and will reduce the viewing and touch input/output experience of the users. Furthermore, the small physical keys of the QWERTY keyboard are also difficult for users to input with accuracy versus the physical keypad to make calls, particularly when using the single hand thumb input method.

Therefore, the advantages of a physical keypad mentioned above are hard to mimic by both touch screen input and physical QWERTY keyboard input.

Additionally, consumers who purchase a smart phone are most likely to use an additional protective case, particularly a flip cover protective case, to protect the exterior of the smart phone and the touch screen of the smart phone from colliding, wearing away, and from damages caused by accidentally knocking, dropping, impacting, etc. The flip cover protective case is made of material such as rubber, silicon, urethane or metals such as aluminium, or a combination of various materials, etc. The flip cover protective case is a protective case or shell or frame which is used by attaching it to the back side and/or edge of the smart phone device, and has an integral flip cover attached to one side of the protective case, shell or frame which can be opened to use the smart phone device and closed when the smart phone is not in use, to protect the touch screen of the smart phone.

However, most of the flip cover protective cases of the smart phone devices typically have just the single function of protecting or decorating the exterior and touch screen of the smart phone. Some of the latest flip cover protective cases do provide additional functions to activate and de-activate the touch screen of the smart phone device when a user opens or closes the flip cover. Some flip covers have transparent viewing windows to display information like the current date and time within the boundary of the transparent viewing window when a user closes the flip cover, and also allow the user to answer a phone call by swiping the transparent viewing window without opening the flip cover.

There are also flip cover protective cases that come with a Bluetooth QWERTY keyboard typically attached to the inner side of the flip cover. The user can only use the keyboard when the flip cover is open. However, the input always needs to occupy both hands of the user, or the user has to put the keyboard flip cover case on a flat surface like a table to do the keyboard input. Furthermore, such type of flip cover is generally much heavier and thicker.

SUMMARY OF THE INVENTION

An aspect of the present invention is to address at least the above-mentioned problems and/or disadvantages and deliver additional advantages, by providing a functional flip cover protective case having a built in physical keypad on the front side of the flip cover when the flip cover is at the closed position, and which occupies a lower portion of the flip cover, and a transparent viewing window on the flip cover located approximately in the middle to upper part of the flip cover. When a user closes the flip cover over the front side of the smart phone, the physical keypad will be activated to take over the input controls of the smart phone device, and when a user opens the flip cover, the physical keypad will be deactivated and return the input controls to the smart phone device. Therefore, the smart phone device with the flip cover closed may be implemented as a cell phone or smart phone with a physical keypad to conveniently make calls, receive calls, do text messaging, etc. without having to open the flip cover, and one-handed operations also are as convenient as the ordinary keypad cell phone. Therefore, whilst protecting the smart phone device, the user can continue to access most of the important smart phone features via the physical keypad input, with the advantages, convenience and the native tactile input of the physical keypad, the present invention addresses one of the biggest shortcomings of touch-based smart phone devices that has no built in physical keypad.

In addition, a sensor may be built into the flip cover to detect the closing and opening action. The same may be achieved for a smart phone device by having light sensor in the front side of the smart phone and therefore, for such a type of smart phone device, the sensor to detect opening and closing of the flip cover is not necessary.

In addition, when the flip cover is in the closed position, the output on the touch screen of the smart phone device will be displayed within the boundary of the transparent viewing window so that the user can view the display output or content via the transparent window.

Another aspect of the present invention is to provide a protective case, shell or frame which can always be used to hold and protect the smart phone device, the protective case, shell or frame having an integral functional flip cover to protect the touch screen of the smart phone device by covering the front side of the smart phone device.

In accordance with an aspect of the present invention, the physical keypad herein refers to a numerical type of a traditional cell phone's keypad. The physical keypad herein is not referring to a physical QWERTY keyboard or other variant of a physical keyboard for a smart phone device.

In accordance with another aspect of the present invention, the physical keypad generally will be located at the lower part of the flip cover. For smaller smart phone devices with a touch screen size approximately 4.5" or smaller, the physical dial pad may be located at the lower middle of the flip cover. For larger smart phone devices with a screen size over approximately 4.5", the physical keypad might be right aligned to be located at approximately the lower right of the flip cover, or left aligned to be located at approximately the lower left of the flip cover, to facilitate single hand thumb input. For even larger devices, like a smart phone tablet, such devices may have one or two separate physical keypads at approximately the lower left and/or lower right portion of the flip cover.

In accordance with a further aspect of the present invention, the transparent viewing window or area will occupy approximately the middle to upper portion of the flip cover and is mostly within the boundary of the smart phone device's touch screen. However, in a flip cover that is formed of transparent material, the transparent viewing window is not required. The main function of the transparent viewing window is to allow the user to view the content or display an output on the smart phone's touch screen when using the physical keypad on a flip cover as the input device for the smart phone.

In accordance with the yet a further aspect of the present invention, the input communication or interactive functions between the physical keypad of the flip cover and the smart phone device may be any one or a combination of the following methods: 1) having a compatible connector to plug into a power/data port of the smart phone device, including but not limited to, a mini USB port, etc., 2) via Bluetooth communication, 3) via NFC communication, and/or 4) via the smart phone's touch screen by using a touch-enabled keypad. As the options 1, 2 and 3 require power sources to function, the power can be obtained through connection with the power port of the smart phone or by using an internal built in rechargeable battery, or both. The internal built in battery may be stored in the protective case or in the flip cover.

In addition, the protective case to hold the smart phone device may be a shell type protective case which covers the back side and edge of the smart phone device, or may be a frame type protective case which covers the edge of the smart phone device, or may be a battery cover type of protective case which replaces the original battery cover of the smart phone device for a smart phone device with a removable battery cover.

In addition, the protective case may have an electric circuit device built in, and a power and data connector to connect to the smart phone device's power and data connector to obtain electrical power for the physical keypad of the flip cover and to communicate with the smart phone device.

In addition, the protective case or the flip cover may have a Bluetooth communication device or NFC communication device built in for communicating the physical keypad with the smart phone device.

In addition, in order to minimize the overall thickness and weight of the flip cover whilst maintaining the good tactile input feel, the physical keypad of the flip cover may be implemented using an embossed or 3D tactile membrane keypad or equivalents in terms of thickness, tactile input feel and durability.

In addition, the physical keypad's design, individual dial key design and layout might be varied and subject to further improvement for better input experiences.

In addition, the protect case, shell or frame may be formed by at least one of the materials including but not limited to, rubber, silicone, urethane, polyurethane, synthetic resin, aluminium, plastic, PVC, synthetic leather or composition material, etc.

In addition, the physical keypad may be implemented using a touch-enabled keypad that is formed by touch sensitive material to provide touch input directly to the touch screen of the smart phone device when the user presses any key on the touch-enabled keypad to touch the surface of the touch screen. Such a method requires key layout and positioning synchronisation between the physical keypad with the touch screen of the smart phone.

In addition, the flip cover may be formed by at least one of the materials including but not limited to rubber, silicone, urethane, polyurethane, synthetic resin, plastic, PVC, synthetic leather or composition material, etc.

In addition, the transparent viewing window may be formed by transparent materials including but not limited to polystyrene, nylon, silicone, and high tensile glasses, etc., that is suitable and durable. Additional treatment and coating may be applied to the transparent viewing window to improve its transparent visual effect and scratch resistance.

In addition, a software module may be implemented in the smart phone device to enable and control the communication and/or functions between the physical keypad with smart phone device.

Other aspects, advantages and salient features of the invention will become apparent to those skilled in the arts from the following detailed description, which, taken in conjunction with the annexed drawings, discloses exemplary embodiments of the invention.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 1:
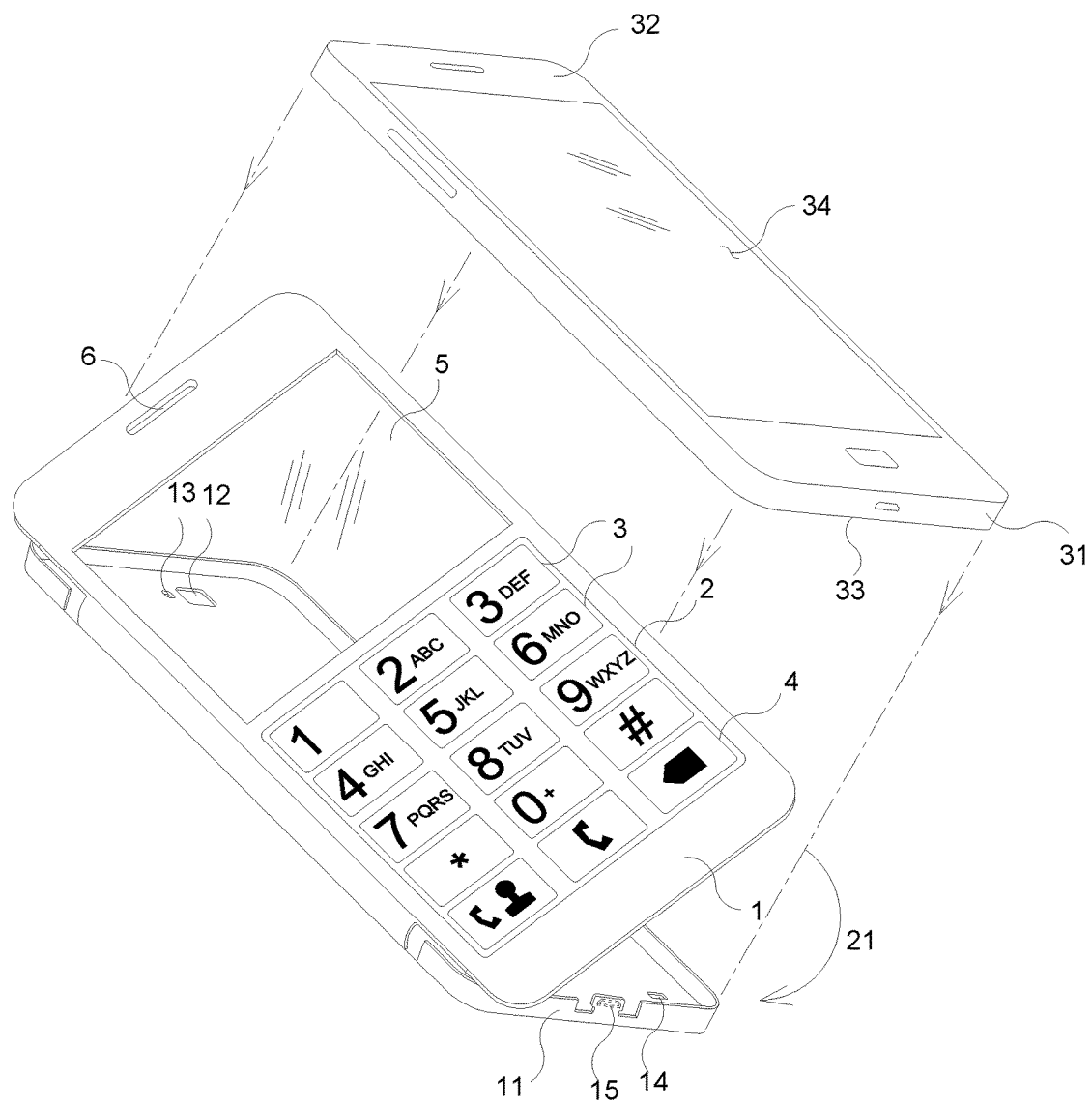
FIG. 1 is a perspective view of a flip cover protective case device with physical keypad where the flip cover is in a partially closed position and illustrating a state in which a smart phone device is being placed into the protective case, with arrows showing direction of movement, according to a $1^{st}$ exemplary embodiment of the present invention.

The present invention refers a smart phone device as a touch input/output-based smart phone or smart phone tablet in which a larger area of the front side of the smart phone device is occupied by a touch screen device, and there is no built in physical keypad for the smart phone device. FIG. 1 is a perspective view of a functional flip cover protective case device with physical keypad where the flip cover 1 is in a partially closed position, and illustrating a state in which a smart phone device 31 is being placed (by the direction of the arrows) into the protective case 11 with the touch screen 34 facing the inside of the front cover 1. The arrow 21 is the closing direction of the flip cover 1. There is a physical keypad 2 with dial keys 3 and function keys 4 occupying the lower portion of front of the flip cover 1. In addition, there is also a transparent viewing window 5 occupying an upper portion of the flip cover 1. The through slot hole 6 on the flip cover 1 is the relief hole for the built in speaker of the smart phone device.

Referring to FIG. 1, label 11 is the protective case or protective back cover for the smart phone device in which there is a relief through hole 12 for the build in camera device of the smart phone device, a relief through hole 13 for the build in flash light of the smart phone device, a relief through hole 14 for the back speaker of the smart phone device, and a power/data port 15 to allow a connection through the protective case to the power/data port of the smart phone device. The position of through holes 12, 13 and 14 may be varied depending on the model of smart phone device to which the protective case is attached. The location and type of power/data port 15 may also be different depending on to which smart phone device it is attached.

Figure 2:
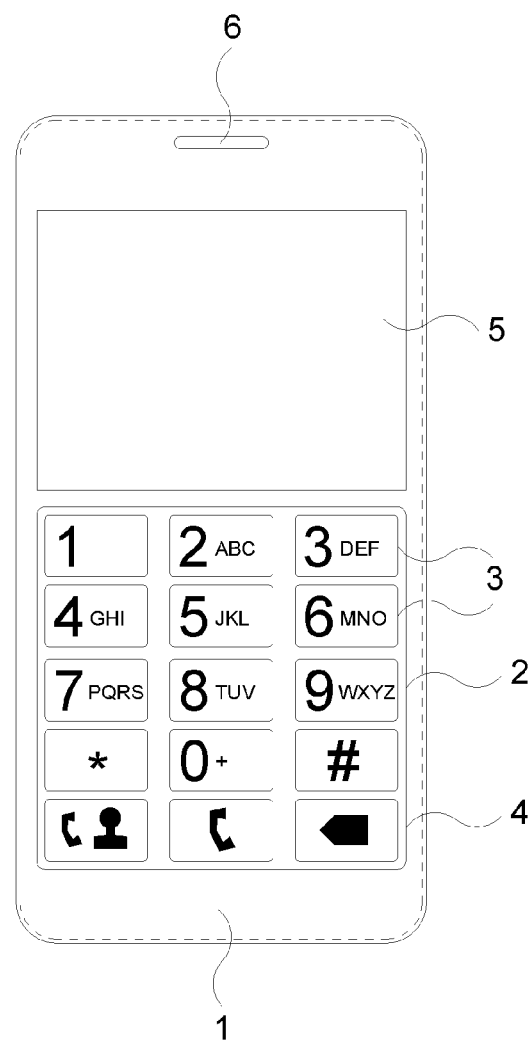
FIG. 2 is a front view and showing the bottom view of a flip cover protective case device with physical keypad where the flip cover is in a fully closed position.
Figure 2:
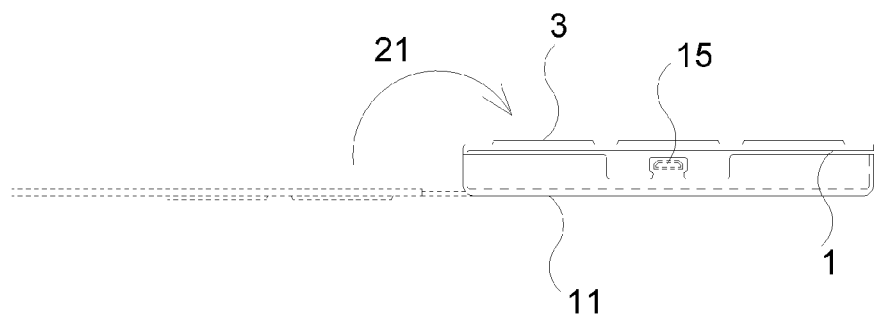

FIG. 2 are combined views illustrating a functional flip cover protective case with physical keypad in which the flip cover is in a fully closed position. The direction arrow 21 illustrates the closing direction of the flip cover front 1.

Figure 3:
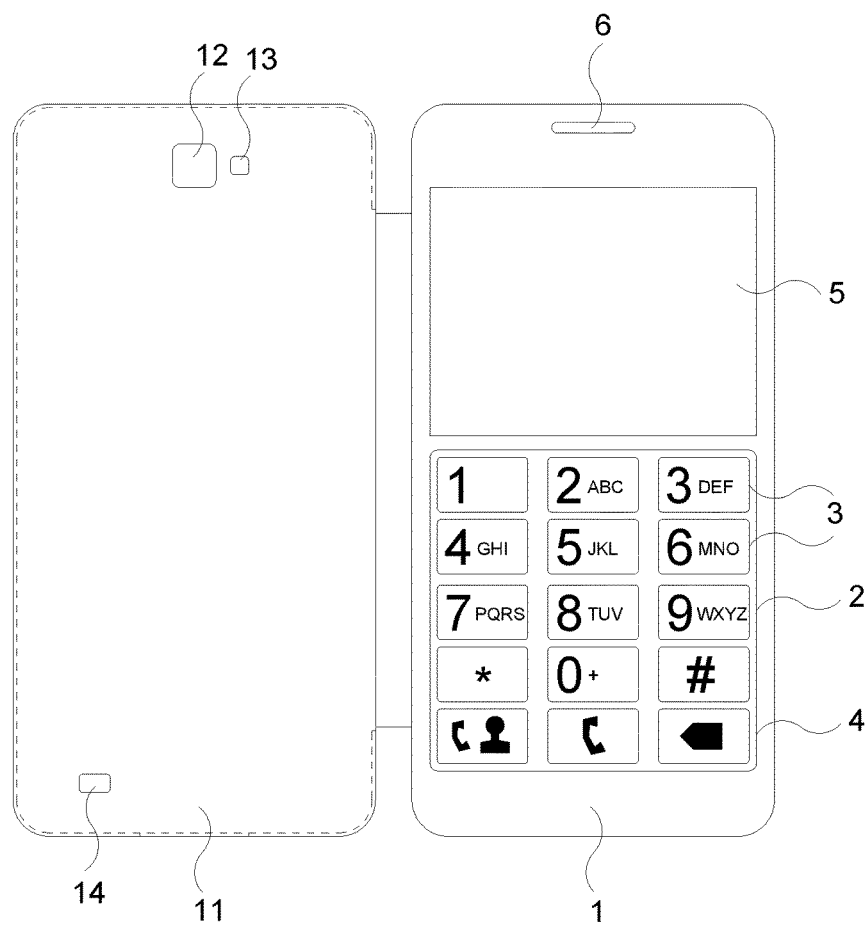
FIG. 3 is a front view of a flip cover protective case device with physical keypad in a fully open position showing both the front of the flip cover and back of the protective case.
Figure 4:
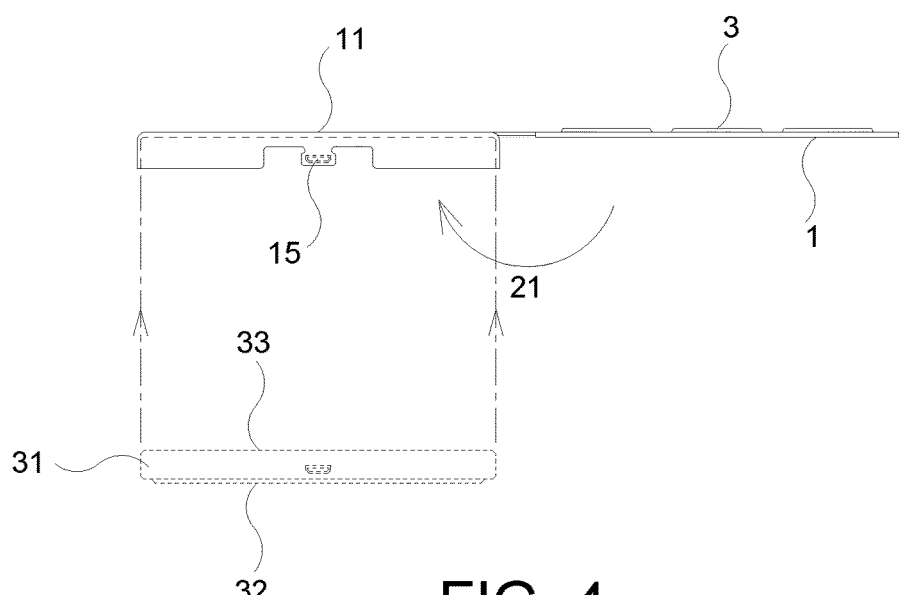
FIG. 4 is showing a bottom view of FIG. 3 with a smart phone device shown in phantom lines and illustrating by the direction of the arrows a smart phone device being placed into the protective case of FIG. 4.

FIG. 3 is a front view of a functional flip cover protective case device with the built in physical keypad in a fully open position showing both the front of the flip cover 1 and back of the protective case 11. FIG. 4 shows the front of FIG. 3 illustrating a state in which a smart phone device 31 is placed into the protective case back 11, where the label 32 is the front of the smart phone device 31 where the touch screen of the smart phone device is located, and the label 33 is the back of the smart phone device 31. Label 21 shows the closing direction of the flip cover after the smart phone device 31 is placed in to the protective case back 11.

Figure 5:
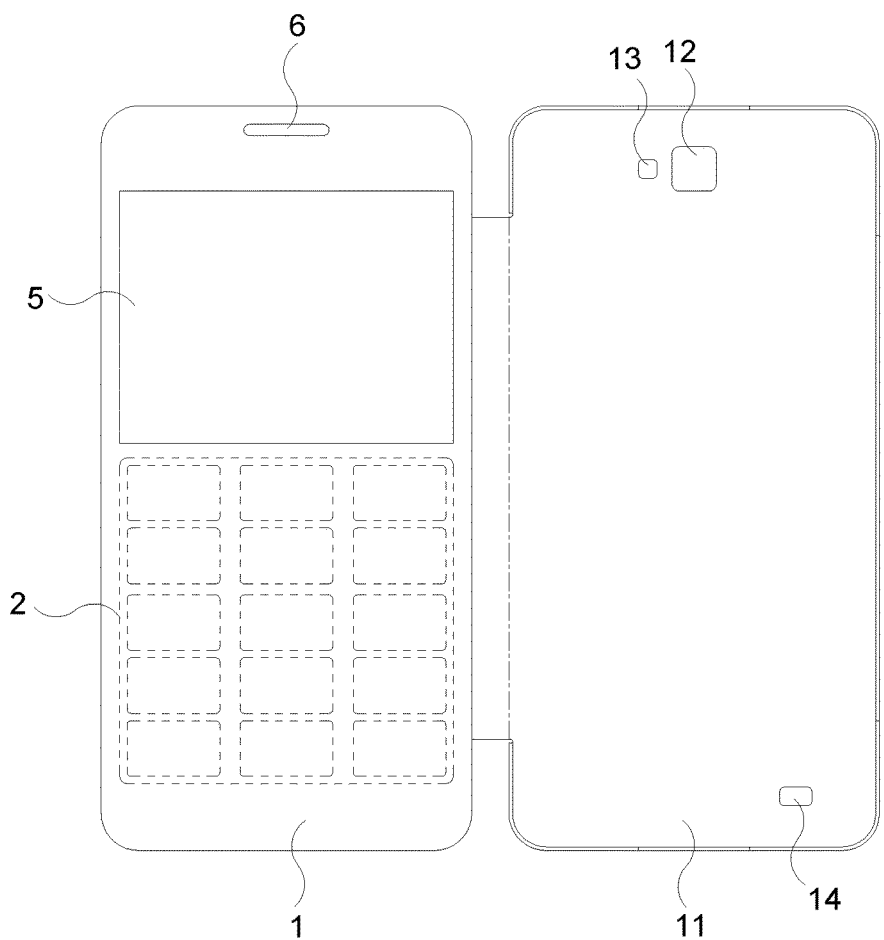
FIG. 5 is a flip cover protective case device with physical keypad in a fully open position showing the inside of both the front of the flip cover and the rear of the protective case.
Figure 6:
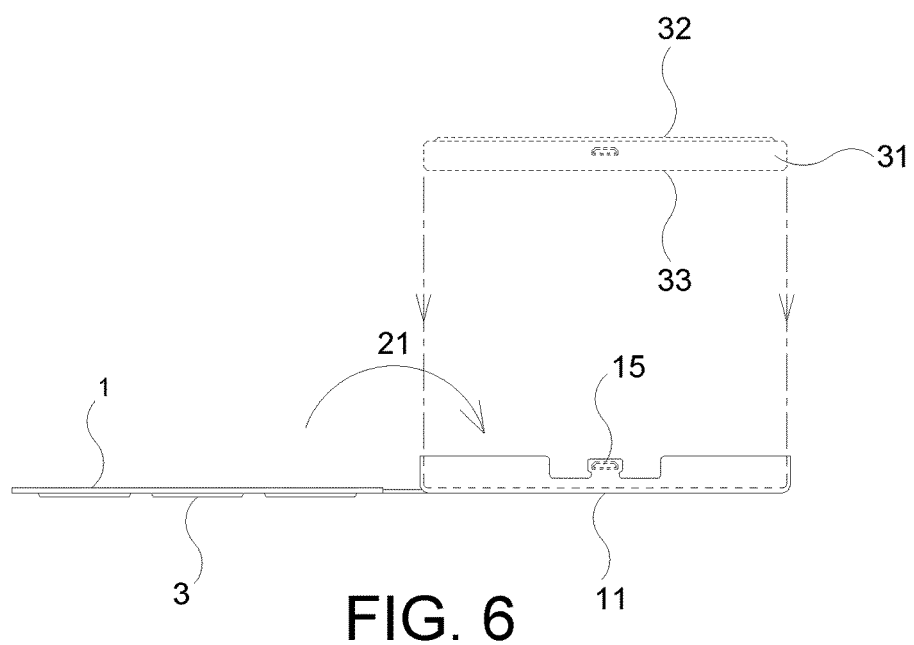
FIG. 6 is a bottom view of FIG. 5 with a smart phone device shown in phantom lines and illustrating by the direction of the arrows a smart phone device being placed into the protective case of FIG. 6.

FIG. 5 is a front view of a flip cover protective case device with built in physical keypad in a fully open position showing both the inner sides of the flip cover 1 and protective case 11. FIG. 6 is the bottom view of the FIG. 5 illustrating a state in which a smart phone device 31 is being placed into the protective case 11 in the direction of the arrows, where the label 32 is the front of the smart phone device 31 where the touch screen of the smart phone device is located, and the label 33 is the back of the smart phone device 31. Label 21 shows the closing direction of the flip cover after the smart phone device 31 is placed into the back of the protective case 11.

Referring to FIGS. 3 and 4, as well as FIGS. 5 and 6, a smart phone device 31 is placed into the inside of the back of a protective case 11 to decorate the exterior thereof or improve a grip feel and to protect the surrounding edge and/or back of smart phone device 31. After the device 31 is placed into the inside of the back of protective case 11, the flip cover 1 can then be closed in direction of arrow 21 to provide protection to the front of the smart phone device 31 where the touch screen is located.

Figure 10:
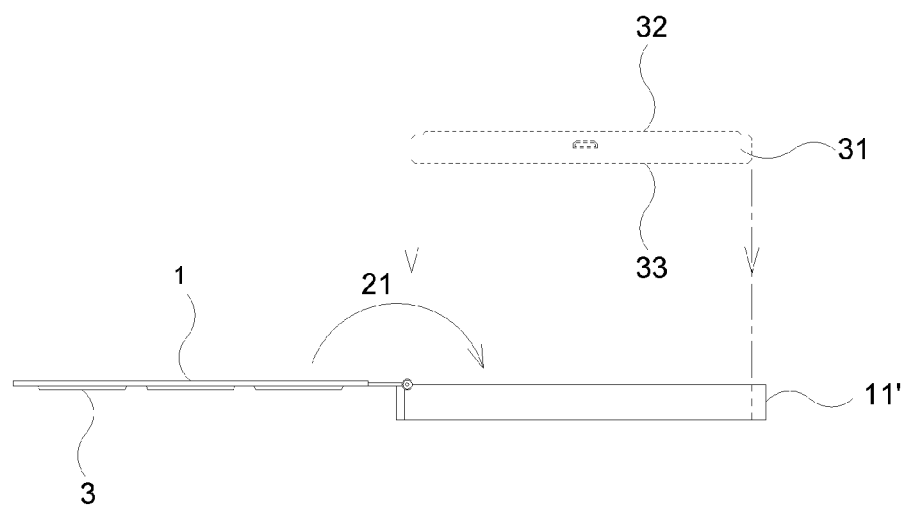
FIG. 10 is a bottom view of FIG. 9 and illustrating a state in which a smart phone device (shown in phantom lines) is being placed by the direction of the arrows into the protective case of FIG. 10.

The exemplary smart phone device 31 depicted in FIGS. 4, 6 and 10 is a touch input/output-based smart phone. Although not shown, there will be a touch screen display device which occupies a greater part of a front 32 of the smart phone device 31, an ear piece speaker for receiving a voice of a peer user is placed at an upper portion of the front 32 of the smart phone device 31, and a microphone for transmitting a voice to the peer user is placed at a lower portion of the smart phone device 31. In addition thereto, although still not shown, such a smart phone may further include various sensors, such as a well-known digital camera module, an ambient light sensor, etc., to improve a function of smart phone device 31.

Referring to FIGS. 1 to 17, there is at least one physical keypad device 2 on the front of flip cover 1. When a smart phone device 31 is placed into the back of the protective cover 11, as illustrated in FIGS. 2, 4 and 10 by the direction of the arrows, and when the user closes the front flip cover 1 over the front of the smart phone device 31, the built in physical keypad on the front of the flip cover will be activated to take over the input controls of the smart phone device so that the user can use the physical keypad on the front side of the flip cover to do all of the telephony operations, including but not limited to making a call, receiving a call, text messaging, etc. In addition, the user can also use the physical keypad to operate all of the smart phone functions possible to operate with the physical keypad when the flip cover is in the closed position.

Although it is shown in FIGS. 1, 2, 4 and 10 that there is a power/data port 15 on the bottom of the protective case 11 which may be used as the power and communication port between the physical keypad 2 and the smart phone device 31, the present invention is not limited thereto, and thus the communication between the physical keypad and the smart phone device may be accomplished using one or a combination of the following methods: 1) having a compatible connector to plug into the power/data port of the smart phone device, including but not limited to a mini USB port, etc., 2) having a built in Bluetooth communication device in the flip cover or protective case, 3) having a NFC communication device in the flip cover or protective case, and/or 4) via the smart phone's touch screen by using a touch-enabled keypad. As options 1, 2 and 3 require power sources to function, such options can obtain the power through connection with the power port of the smart phone or by using an internal build in rechargeable battery, or both. The internal built in battery may be stored in the protective case or in the flip cover.

Although it is shown in FIGS. 1, 2, 3, 5, 7, 9, and 11 to 17 that there is at least a transparent viewing window 5 on the flip cover 1, the present invention is not limited thereto, and thus, the flip cover may be formed by transparent material, so that a transparent viewing window 2 is not required.

In addition, although is shown in FIGS. 1, 2, 3, 5, 7, 9, 11 to 17 that the flip cover 1 is covering approximately the whole area or surface of the front of a smart phone device, the present invention is not limited thereto, and the flip cover may cover a smaller area or surface of the front of the smart phone device, but will always at least cover the whole surface area of the touch screen on the front of the smart phone device.

Figure 7:
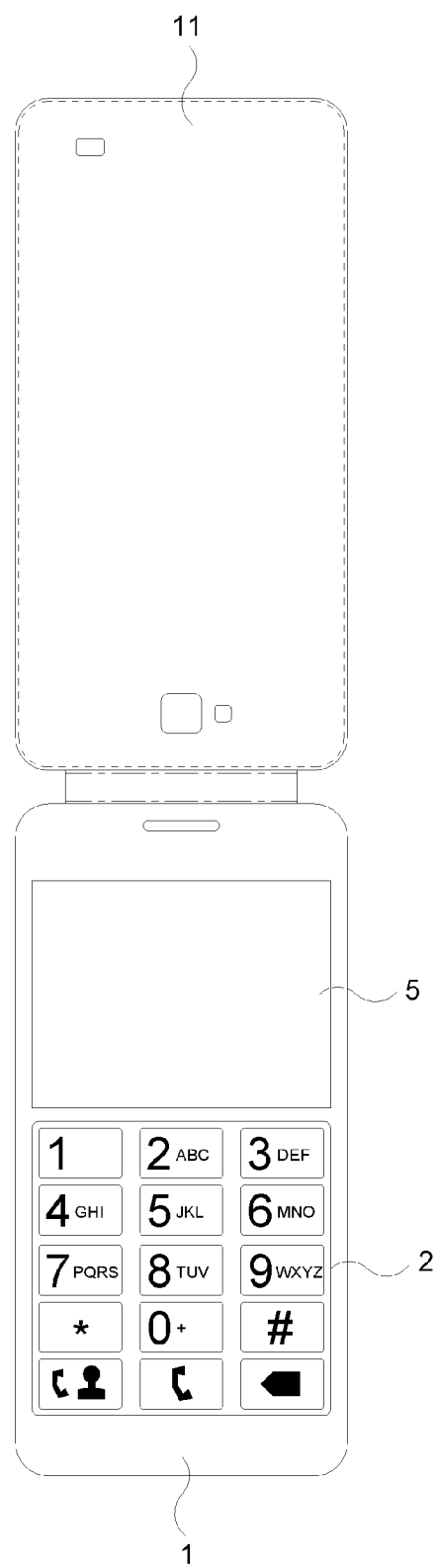
FIG. 7 is a flip cover protective case device with physical keypad with a different flip cover opening direction, from bottom to top instead of from left to right, according to the $2^{nd}$ exemplary embodiment of the present invention.
Figure 8:
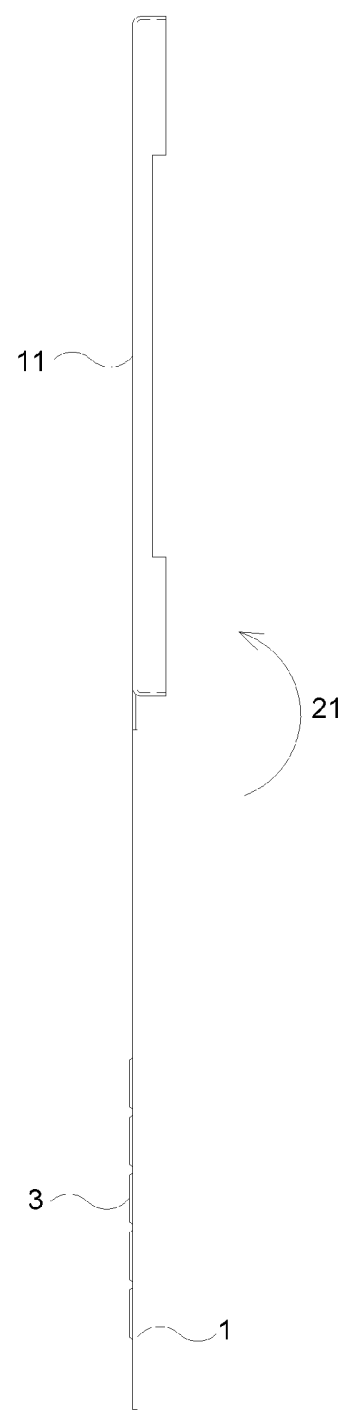
FIG. 8 is a right side view of FIG. 7.
Figure 9:
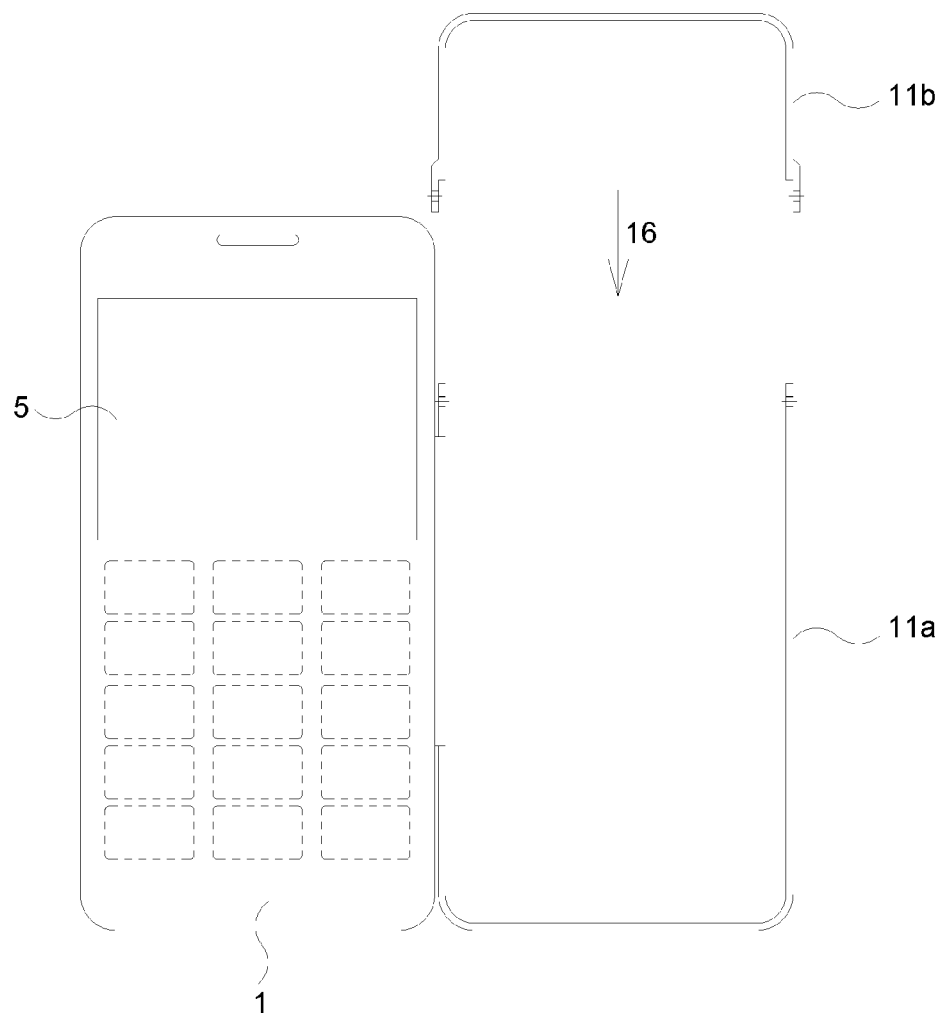
FIG. 9 is another version of a flip cover protective case device with physical keypad similar to FIG. 5 in which the protective case is a frame type case according to a $3^{rd}$ exemplary embodiment of the present invention.

FIGS. 7 and 8 illustrate another variant of an exemplary embodiment of the present invention, where the flip cover with physical keypad is attached at the top or bottom of the protective case instead of left or right side of the protective case. FIGS. 9 and 10 illustrate another protective case embodiment where the protective case is formed by a frame in which the U shaped frame portion 11*a* will combine with U shaped frame portion 11*b* in direction of arrow 16 over the edge of the smart phone device, to hold and protect the smart phone device. The type of protective case to be used is not limited to the above-mentioned designs; it may also use the battery cover type, etc. of a protective case to replace the original battery cover of the smart phone device if the smart phone device has a removable battery cover, etc.

Figure 11:
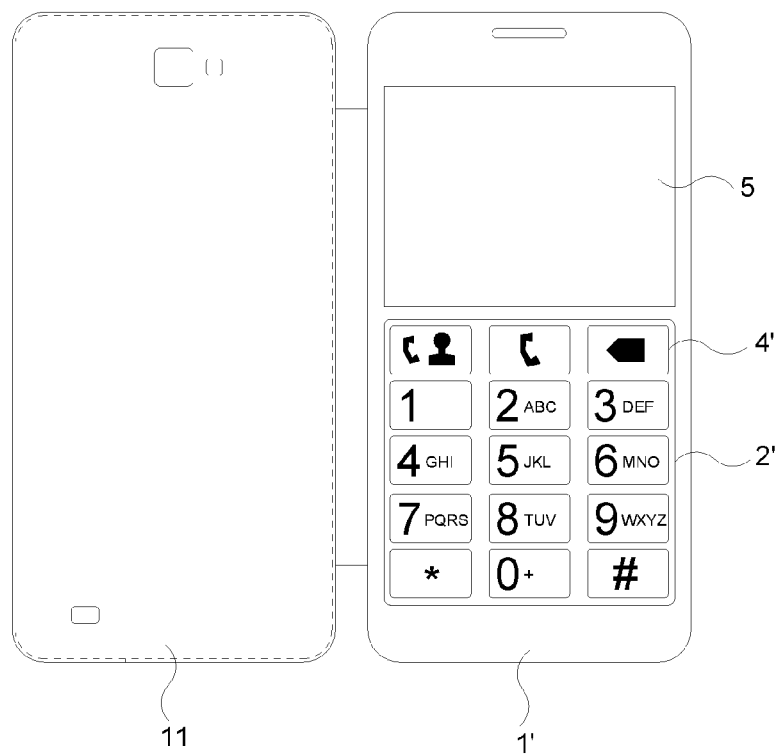
FIG. 11 is a flip cover protective case device with physical keypad with a different keypad layout design according to a $4^{th}$ exemplary embodiment of the present invention.
Figure 12:
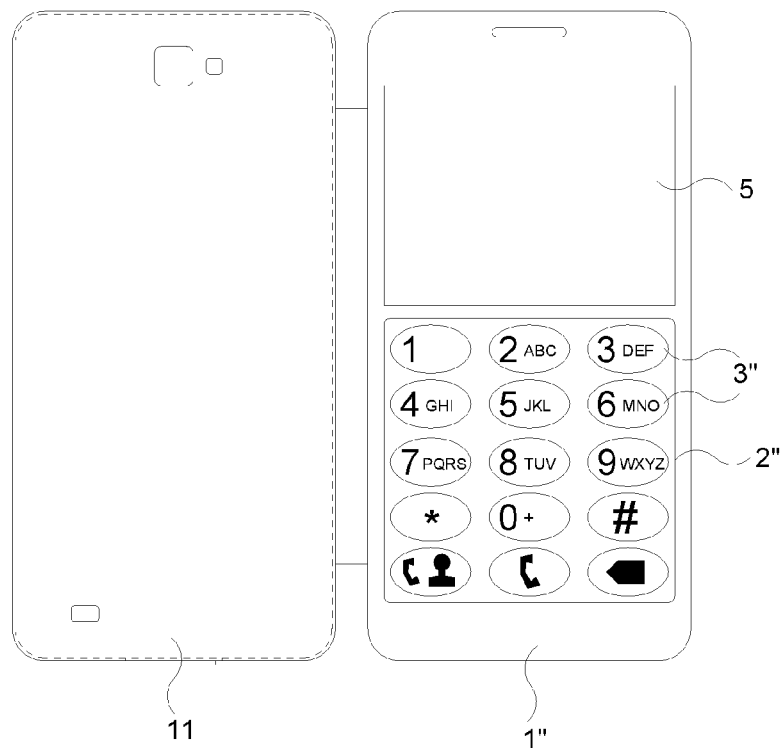
FIG. 12 is a flip cover protective case device with physical keypad with a different dial keys design according to a $5^{th}$ exemplary embodiment of the present invention.
Figure 13:
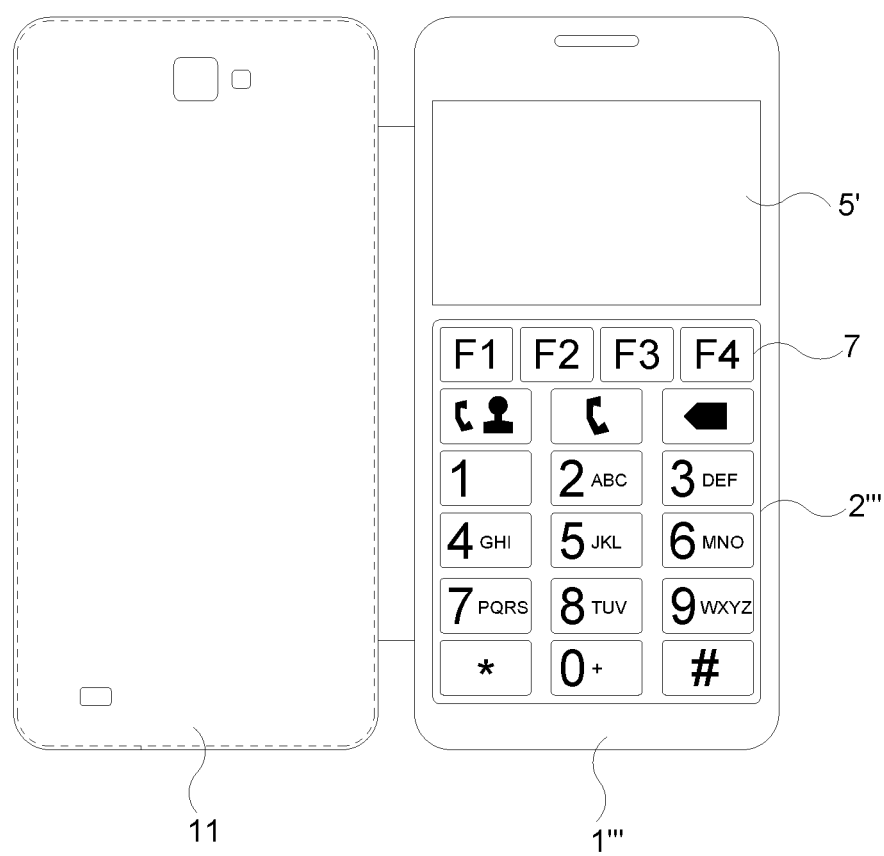
FIG. 13 is a flip cover protective case device with physical keypad with additional function keys according to a $6^{th}$ exemplary embodiment of the present invention.

FIGS. 11, 12 and 13 show a variety of types of physical keypad layout designs, dial key designs and function key designs, although the present invention is not limited thereto, and thus, may use different physical keypad designs and layouts to provide better keypad input functionality and experience.

Figure 14:
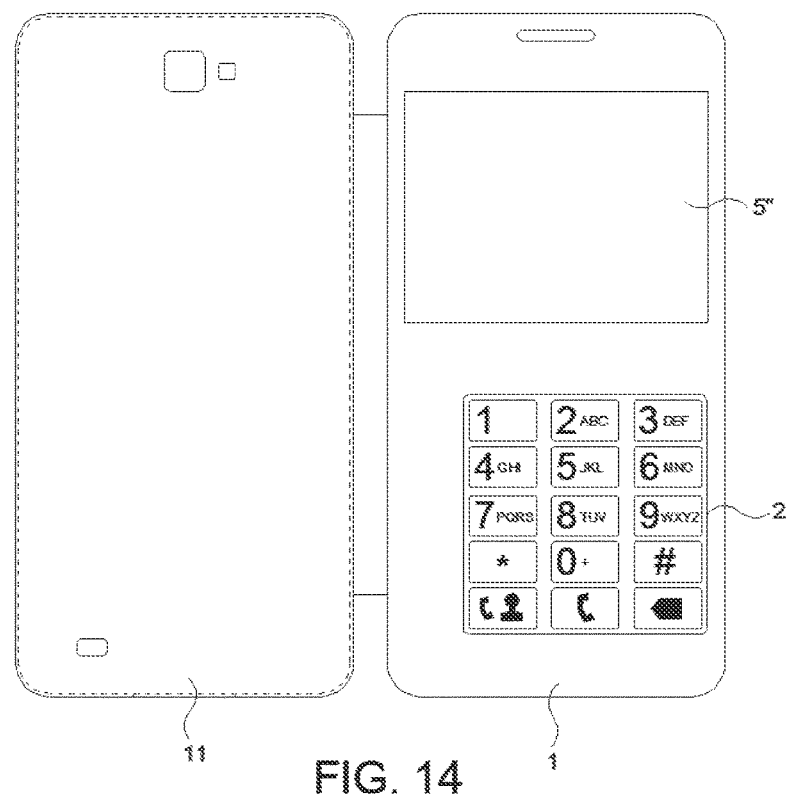
FIG. 14 is a flip cover protective case device with physical dial pad of the present invention showing the right alignment of the dial pad for a bigger size of smart phone devices according to a $7^{th}$ exemplary embodiment of the present invention.
Figure 15:
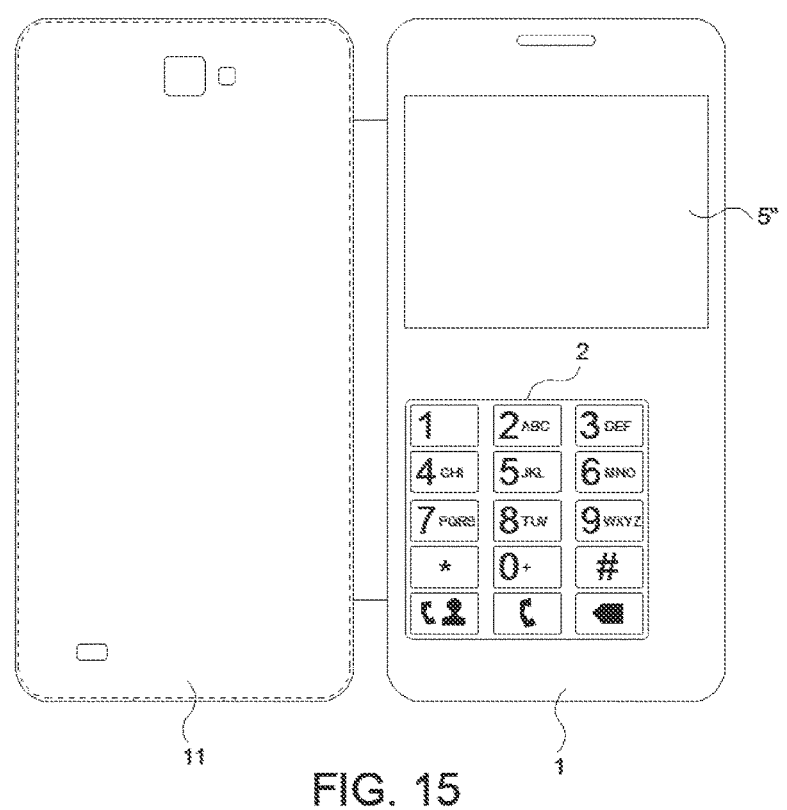
FIG. 15 is a flip cover protective case device with physical keypad showing the right alignment of the keypad for a bigger size of smart phone device according to an $8^{th}$ exemplary embodiment of the present invention.

FIGS. 14 and 15 illustrate the positioning of the physical keypad to be right and/or left aligned on the flip cover. It is necessary for a bigger size smart phone device to make the one-handed operation easy.

Figure 16:
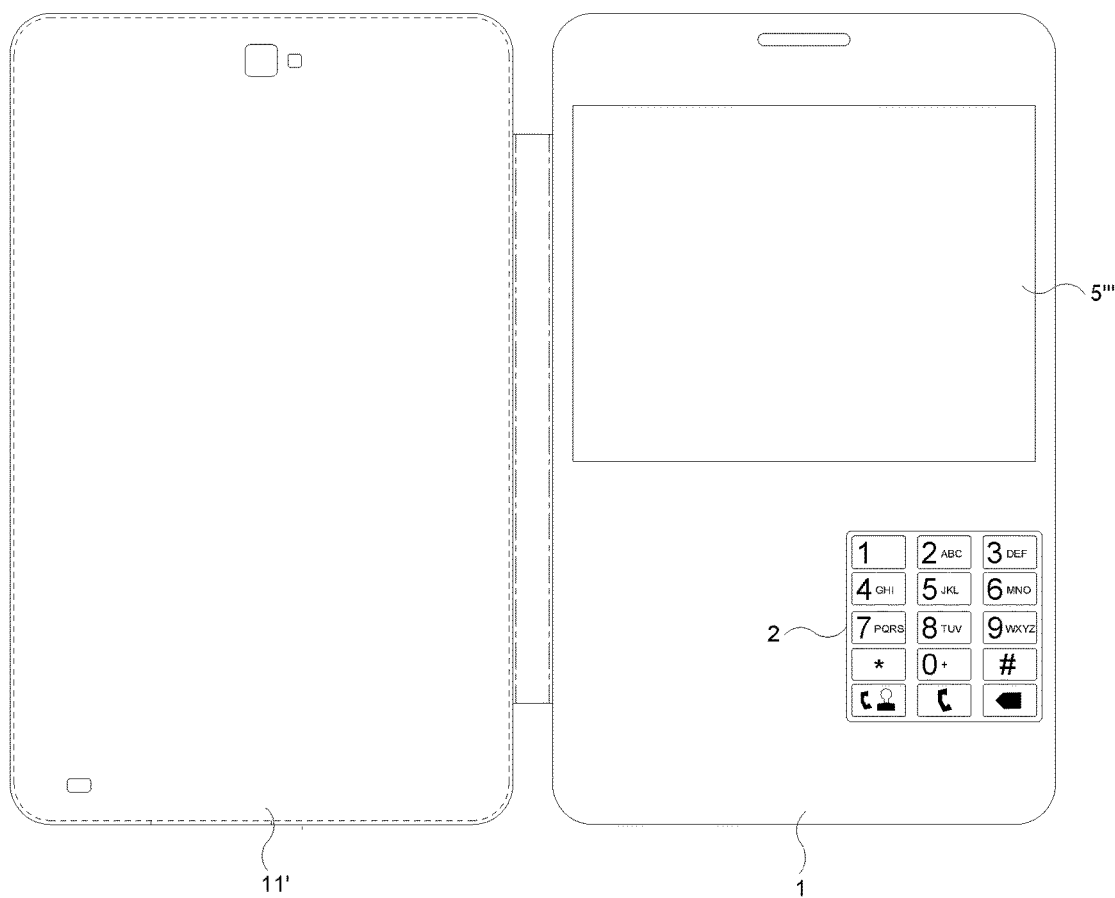
FIG. 16 is a flip cover protective case device with physical keypad showing the left alignment of the keypad for a smart phone tablet device according to a $9^{th}$ exemplary embodiment of the present invention.
Figure 17:
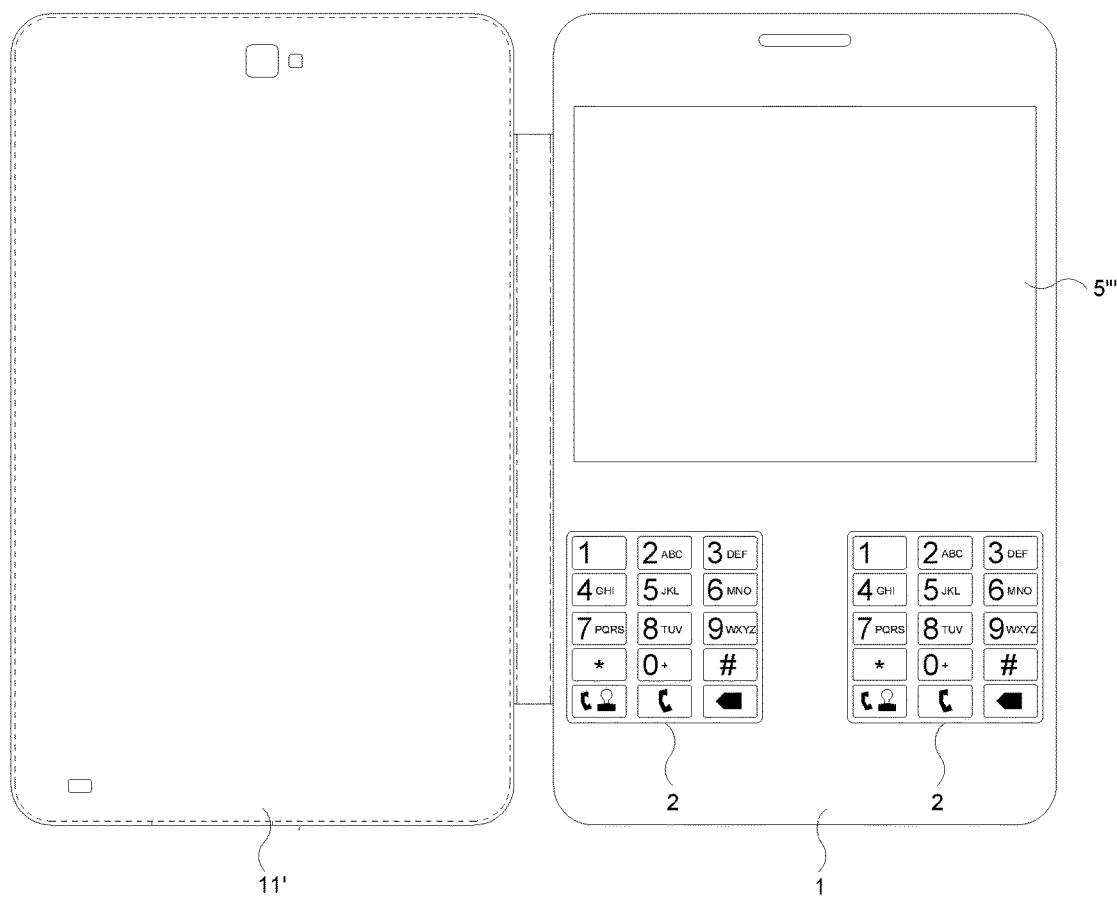
FIG. 17 is a flip cover protective case device with physical keypad showing 2 keypads on the lower left and the lower right of a smart phone tablet device according to a $10^{th}$ exemplary embodiment of the present invention.

FIGS. 16 and 17 illustrate the physical keypad on the flip cover of a smart phone tablet device. As the smart phone tablet device is much bigger, there may be two physical keypads, one on left side and one on the right side of the flip cover as shown in FIG. 17, so that the user can use either the left or right hand to do the input.

In addition, although not shown, a sensor may be built into the flip cover 1 to detect the closing and opening action actions. The same may be achieved for a smart phone device that has a light sensor in the front of the smart phone and therefore, for such type of smart phone device, the sensor on the flip cover is not necessary.

In addition, when the flip cover 1 is in the closed position, the output on the touch screen of the smart phone device will be displayed within the boundary of the transparent viewing window 5 so that the user can view the display output or content via the transparent window.

Another aspect of the present invention is to provide a protective case, shell or frame which can always be used to hold and protect the smart phone device and the back of the protective case 11 or frame 11a and 11b have an integral functional flip cover 1 to protect the touch screen of the smart phone device by covering the front of the smart phone device.

In accordance with an aspect of the present invention, the physical keypad 2 herein refers to a numerical type of a traditional cell phone's keypad. The physical keypad herein is not referring to a physical QWERTY keyboard or other variant of physical keyboard for the smart phone device.

In addition, the protective case may have an electric circuit device built in, and a power and data connector to connect to the smart phone device's power and data connector to obtain electrical power for the physical keypad 2 of the flip cover 1 and to communicate with the smart phone device.

In addition, although not shown, the protective case 11 or the flip cover 1 may have a Bluetooth communication device or a NFC communication device built in for communicating the physical keypad 2 with the smart phone device.

In addition, in order to minimize the overall thickness and weight of the flip cover while maintaining good tactile input feel, the physical keypad 2 of the flip cover 1 may be implemented using an embossed tactile membrane keypad or equivalents in terms of thickness, tactile input feel and durability.

In addition, the physical keypad's design, individual dial key design and layout might be varied and subject to further improvement from time to time for better input experiences.

In addition, the protective case 11 or frame 11a, 11b may be formed by at least one of the materials including, but not limited to, rubber, silicone, urethane, polyurethane, synthetic resin, aluminium, plastic, PVC, synthetic leather or composition material, etc.

In addition, the physical keypad 2 may be implemented using a touch-enabled keypad that is formed of touch sensitive material to provide touch input directly to the touch screen of the smart phone device when the user presses any key on the touch-enabled keypad to touch the surface of the touch screen. Such a method requires key layout and positioning synchronisation between the physical keypad and the touch screen of the smart phone.

In addition, the flip cover 1 may be formed of at least one of the materials including, but not limited to, rubber, silicone, urethane, polyurethane, synthetic resin, plastic, PVC, synthetic leather or composition material, etc.

In addition, the transparent viewing window 5 may be formed of transparent materials including, but not limited to, polystyrene, nylon, silicone, high tensile glasses, etc. that are suitable and durable. Additional treatment and coating may be applied to the transparent viewing window to improve its transparent visual effect and scratch resistance.

In addition, a software module may be implemented in the smart phone device to correspond to the physical keypad and/or sensor of the flip cover 1.

The advantage of the present invention is to add physical keypad functionalities to the smart phone device that the physical keypad does not presently contain. The present invention not only serves the original purpose of protecting and decorating the smart phone devices, but also allows a user to continue to use a majority of functions of the smart device when the flip cover is closed via the physical keypad on the front of the flip cover. The physical keypad on the flip cover also makes one-handed operations possible to make a call, receive a call, use text messaging etc. This is particularly crucial when there is a need to make an urgent call whilst only one hand is free for safety purposes.

As would be seen by one skilled in the art, there are various methods capable of modifying these embodiments without departing from the scope of claims in the present invention. In other words, there may be many other methods by which the present invention can be implemented without departing from the scope of the claims.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

The invention claimed is:

1. A functional flip cover protective case device for a touch-based smart phone device, comprising:
   a protective case to hold and protect the smart phone device and a flip cover attached to a protective case device to protect the touch screen of the smart phone device;
   a built in physical keypad device on the front side of the flip cover when the flip cover is in a closed position;
   a transparent viewing window on the flip cover to view a display output on the smart phone device's touch screen when using the physical keypad device on a flip cover as an input device for the smart phone device;
   wherein upon the flip cover being moved to the closed position, the display output on the touch screen of the smart phone device will limit the display proximate to be within the boundary of the transparent viewing window.

2. The functional flip cover protective case device of claim 1, wherein a censor device is built into the flip cover to detect the opening and closing action of the flip cover.

3. The functional flip cover protective case device of claim 1, wherein when the flip cover is in the closed position, the physical device is activated to take over the input controls of the smart phone device.

4. The functional flip cover protective case device of claim 1, wherein when the flip cover is in the open position, the physical device will be deactivated and the input controls will be released to the smart phone device.

5. The functional flip cover protective case device of claim 1, further comprising a software module installed in the smart phone device to ensure correspondence with the censor and physical device of the flip cover.

6. The functional flip cover protective case device of claim 1, wherein the flip cover covers the entire surface of the touch screen on the front side of the smart phone device.

7. The functional flip cover protective case device of claim 1, wherein the positioning of the physical device may be left or right align for bigger size smart phones.

8. The functional flip cover protective case device of claim 1, wherein the flip cover may be attached to any side of the protective case.

9. The functional flip cover protective case device of claim 8, wherein the physical keypad device is a numeric type keypad with a variety of design, layout and function keys.

10. The functional flip cover protective case device of claim 9, wherein the physical keypad device excludes a QWERTY keyboard type of keypad.

11. The functional flip cover protective case device of claim 8, wherein the physical keypad device is of a super thin keypad type such as, one of, an emboss or 3D tactile membrane keypad or equivalents in terms of thickness and tactile input feel.

12. The functional flip cover protective case device of claim 1, wherein the physical keypad device is built into a front side of the flip cover.

13. The functional flip cover protective case device of claim 1, wherein a specialized software module is implemented in the smart phone device for correspondence with at least one of, the physical device and the sensor of the flip cover.

14. The functional flip cover protective case device of claim 1, wherein the flip cover is of transparent type material.

15. A functional flip cover protective case device for a touch-based smart phone device, comprising:
- a protective case to hold and protect the smart phone device and a transparent flip cover attached to the protective case to protect the touch screen of the smart phone device;
- a built in physical keypad device on the front side of the flip cover when the flip cover is in a closed position;
- the transparent flip cover permitting viewing a display output on the smart phone device's touch screen when using the physical keypad device on a flip cover as an input device for the smart phone device;
- wherein upon the flip cover being moved to the closed position, the display output on the touch screen of the smart phone device will limit the display proximate to be within the boundary of the transparent flip cover.

* * * * *